(12) United States Patent
Mai

(10) Patent No.: US 7,232,538 B2
(45) Date of Patent: Jun. 19, 2007

(54) INJECTION MOLDING COUPLING APPARATUS

(75) Inventor: Arnold Mai, Irrel (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 356 days.

(21) Appl. No.: 10/966,710

(22) Filed: Oct. 15, 2004

(65) Prior Publication Data

US 2006/0083808 A1    Apr. 20, 2006

(51) Int. Cl.
*B29C 45/18* (2006.01)

(52) U.S. Cl. .................... 264/328.8; 425/572; 425/574

(58) Field of Classification Search ................ 425/130, 425/112, 129.1, 570, 574, 572, 588; 264/328.8
See application file for complete search history.

(56) References Cited

FOREIGN PATENT DOCUMENTS

JP          9-1598       *    1/1997

* cited by examiner

Primary Examiner—Tim Heitbrink

(57) ABSTRACT

Injection molding coupling apparatus and method is configured to be installed between a relatively movable injection unit and a relatively stationary unit base. A subplate is configured to be relatively movable with respect to the unit base, and preferably includes linear bearings for rolling on a pair of linear rails. A flexible pad device is configured to be disposed between the subplate and the injection unit. The flexible pad device is configured to minimize misalignment caused by thermal elongation of heated components and the relative movement between the injection unit and the unit base.

13 Claims, 6 Drawing Sheets

INJECTION MOLDING COUPLING APPARATUS

BACKGROUND OF THE INVENTION

1. Field of the Invention

The present invention relates to an improved injection molding apparatus and method whereby a relatively flexible mounting assembly is provided for mounting a relatively movable injection unit with respect to a relatively stationary unit base.

2. Description of Related Art

In some multi material injection molding applications, a second injection unit is coupled to a movable platen. In such applications, the second injection unit is coupled to a sub plate which moves along a stationary structure (such as rails) as the moving platen moves back and forth. However, the heat generated during the molding operation often causes thermal elongation of the heated components in the sub plate sand the stationary structure, leading to misalignment of the injection unit with respect to the rails. This may restrict the movement of the injection unit or even cause a failure of the coupling parts.

U.S. Pat. No. 4,243,362 to Rees and U.S. Pat. No. 4,444,711 to Schad both disclose multi-material turret injection molding machines having one of their two injection units mounted on the machine's movable platen and directly connected to that portion of the mold that is mounted to the movable platen with a conventional sealing nozzle/bush interface.

Japanese Publication 61-121912 to Shoichi discloses a multi-material injection molding machine having two injection units that connect to hot runners mounted within intermediate movable platens via nozzles.

PCT publication WO 02/22340 to Schuett discloses an injection molding machine having a single injection unit slidably mounted alongside and parallel to the clamp mechanism that is releasably sealed to the molds' infeeding ports by a cylinder that also maintains the sealed relationship throughout the molding cycle.

Thus, what is needed is structure and method for movably coupling the relatively moving injection unit to the relatively stationary support structure in such a way as to minimize any misalignment, part stress, or failure caused by the movement.

SUMMARY OF THE INVENTION

It is an advantage of the present invention to provide a flexible mounting assembly for mounting the relatively movable injection unit to the relatively stationary mounting rails, so as to reduce stress on the moving parts.

According to a first aspect of the present invention, a unique combination of structure and/or steps is provided for an injection molding coupling configured to be installed between a relatively movable injection unit and a relatively stationary unit base. A subplate is configured to be relatively movable with respect to the unit base. A flexible pad device is configured to be disposed between the subplate and the injection unit. The flexible pad device is configured to minimize misalignment caused by thermal elongation of heated components and the relative movement between the injection unit and the unit base.

According to a second aspect of the present invention, a unique combination of steps is provided for method of coupling a relatively movable injection unit to a relatively stationary unit base in an injection molding device. A subplate is disposed so as to be relatively movable with respect to the relatively stationary base unit. A plurality of flexible pads is disposed between the subplate and the relatively movable injection unit, the plurality of flexible pads being configured to absorb stresses induced by the relative movement of the injection unit and the base unit.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a plastic injection molding machine injects two different plastic melts into a mold through two different hot runner systems. The second injection unit is mounted to the movable portion of the mold, and thus is supplied with the second plastic melt through an articulated coupling which maintains a good seal throughout its operating environment. The moving injection unit is mounted to stationary rails using a novel flexible mount. However, the present invention will also find applicability in any injection molding process (such as thixomolding, injection-blow molding and injection-compression molding which may benefit from being able to provide a melt through an articulated coupling.

2. The Structure of the Preferred Embodiment

Figure 1:
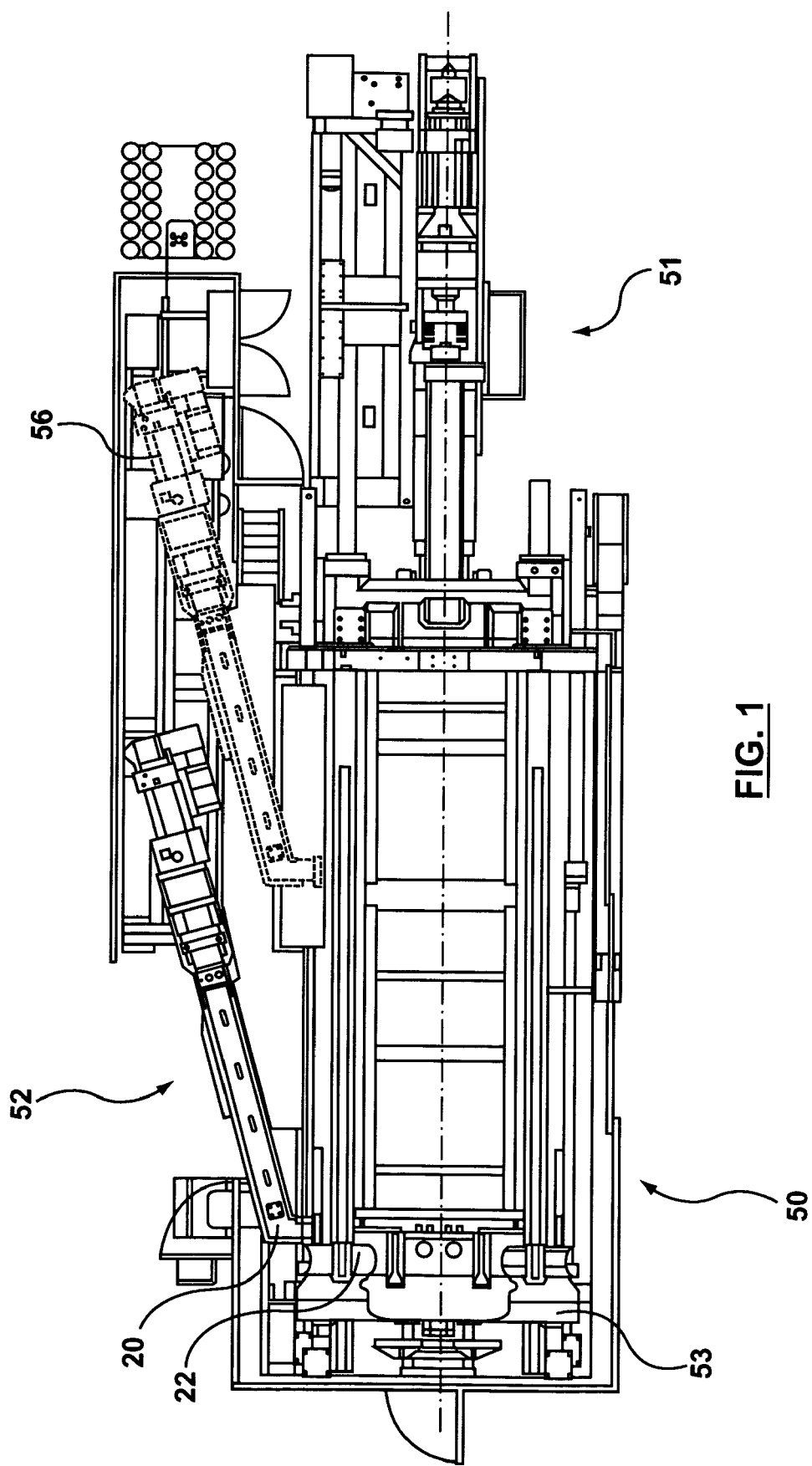
FIG. 1 is a schematic plan view of a multi-material injection molding machine according to a preferred embodiment according to the present invention.
Figures 2, 3:
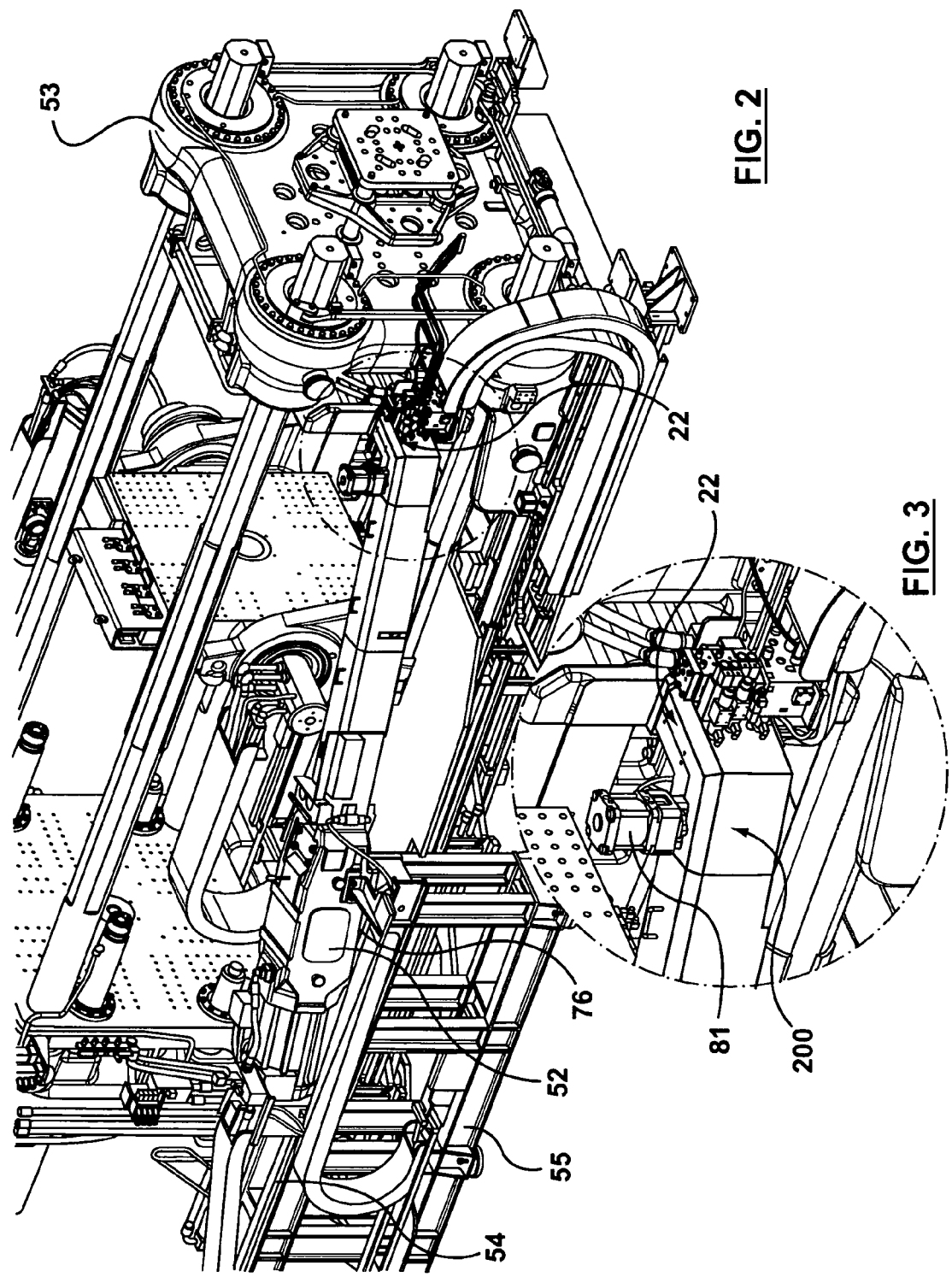
FIG. 2 is a perspective view of the multi-material injection molding machine according to a preferred embodiment according to the present invention.
FIG. 3 is a close-up perspective view of the articulated joint location according to a preferred embodiment according to the present invention.
Figure 4:
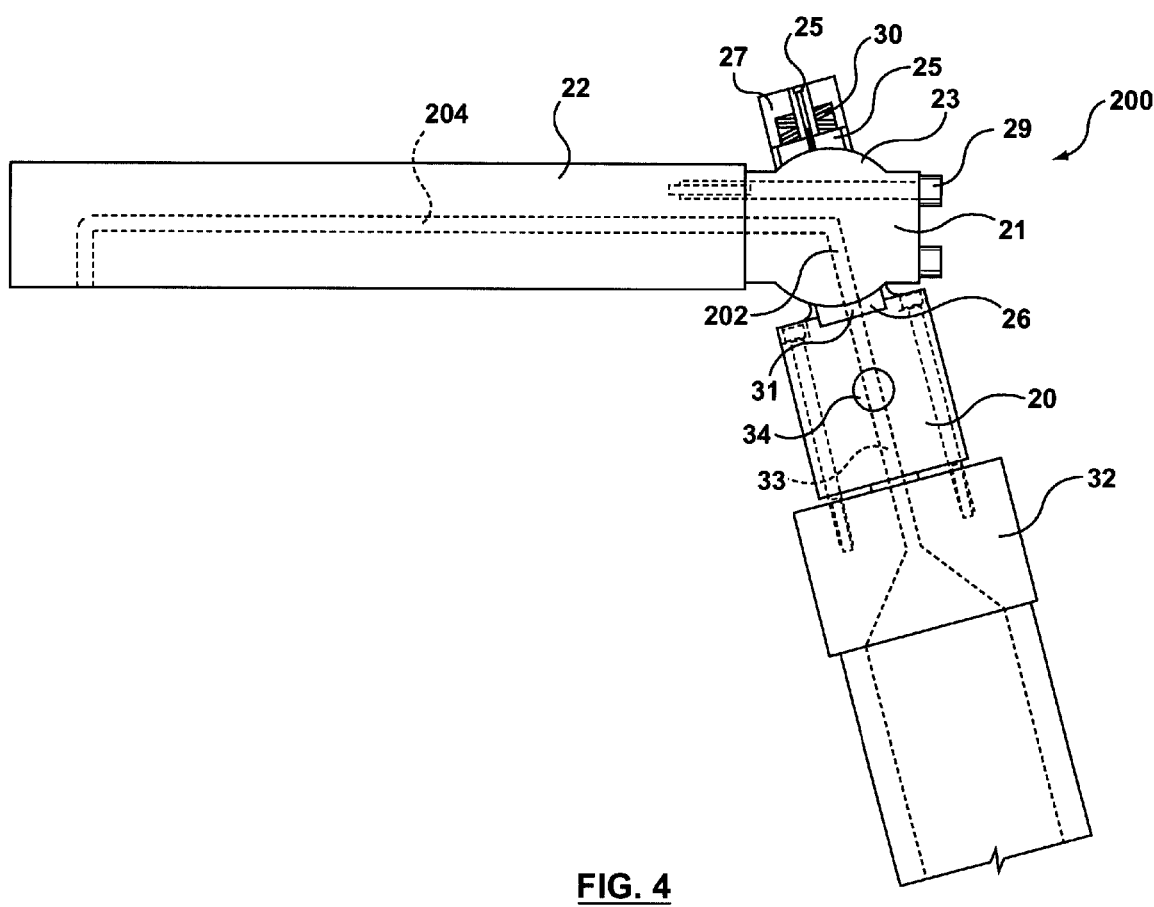
FIG. 4 is a schematic plan view of the hot runner-injection unit connection assembly of the FIG. 1 embodiment.
Figure 5:
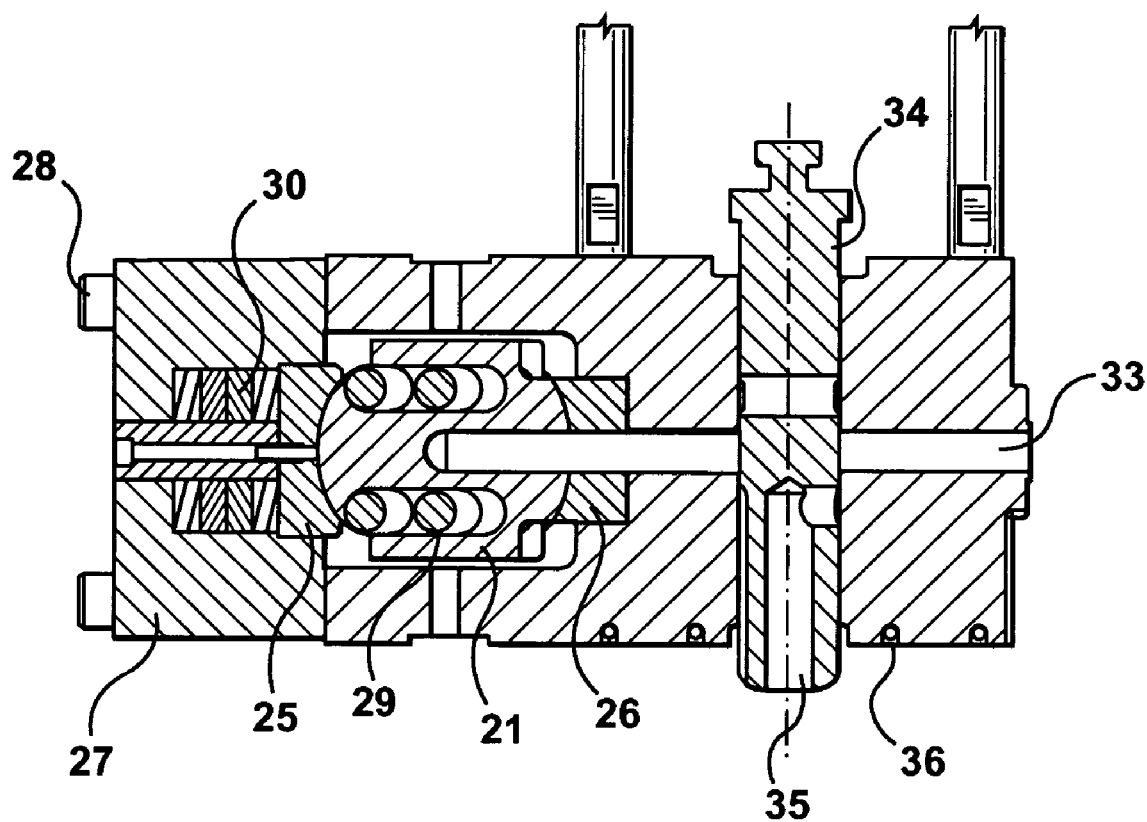
FIG. 5 is a cross section view of the distributor block and hot runner extension of the FIG. 1 embodiment.
Figure 6:
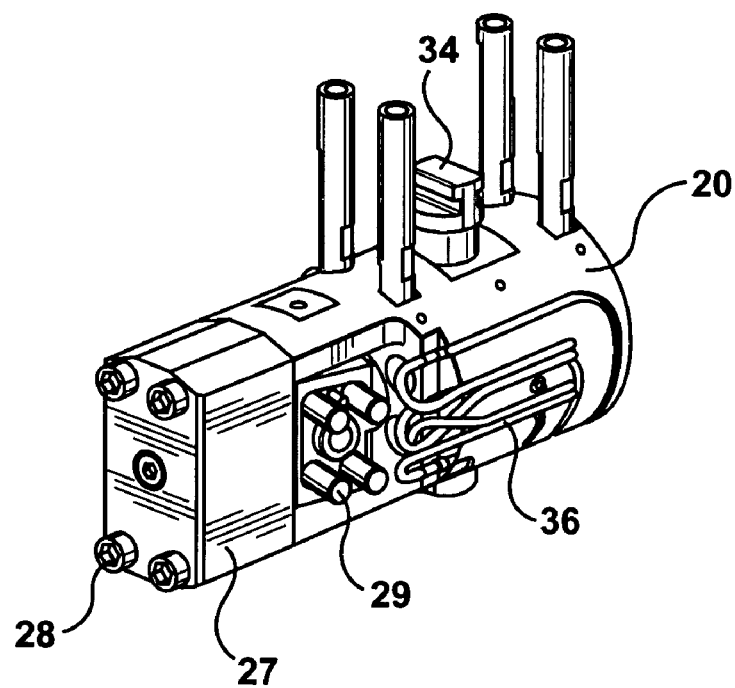
FIG. 6 is an isometric view of the distributor block and hot runner extension of the FIG. 1 embodiment.
Figure 7:
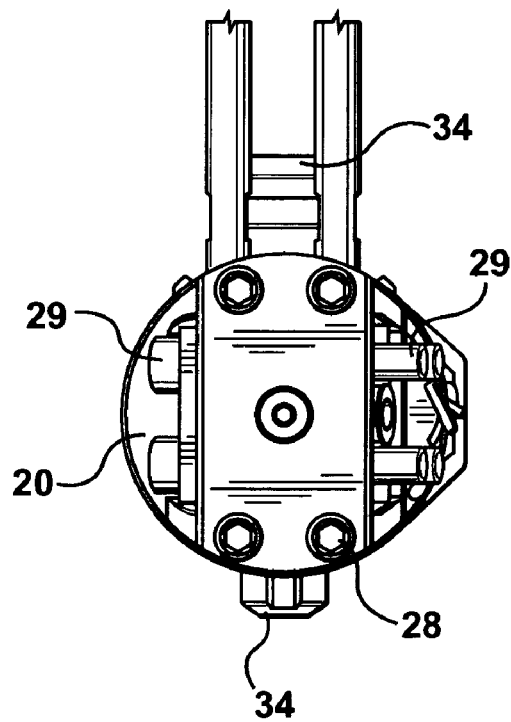
FIG. 7 is an end view of the distributor block of the FIG. 1 embodiment.
Figure 8:
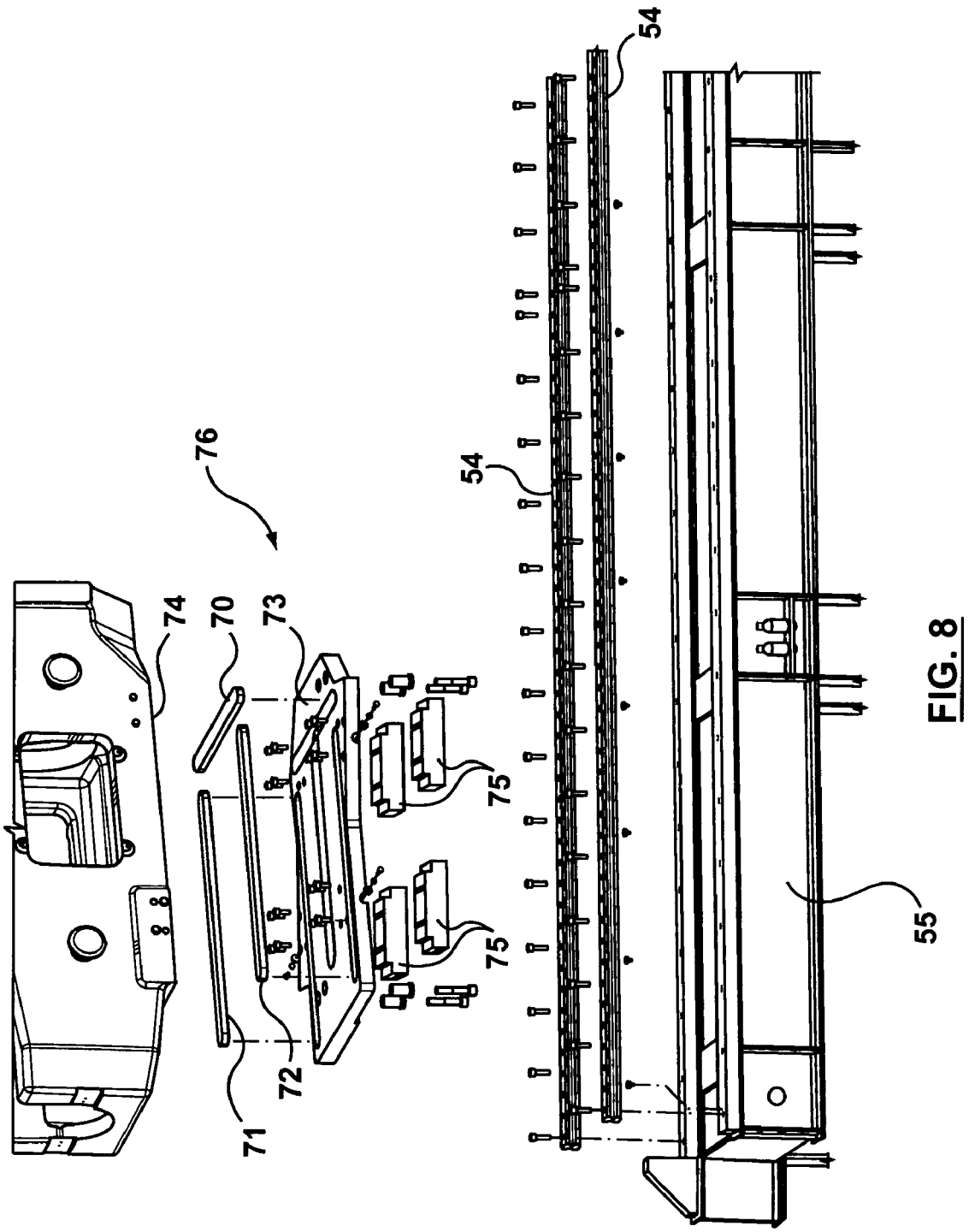
FIG. 8 is an exploded isometric view of the second injection unit mounting, of the FIG. 1 embodiment.

FIGS. 1-3 are schematic and perspective views of a multi-material injection molding machine comprising a clamp unit 50, a first injection unit 51, and a second injection unit 52. The second injection unit 52 is bolted to a distributor block 20 that is bolted to a hot runner 22 that is, in turn, attached to the moving platen 53. FIGS. 2 and 8 shows that the second injection unit 52 is mounted on a carriage assembly 76 that includes a subplate 73 that rides on four linear bearings 75. The linear bearings 75 are mounted on linear rails 54 that are attached to the second injection unit base 55. As the moving platen 53 moves from its mold open position (as shown in FIG. 1) to its mold closed position, it moves the second injection unit 52 along with it. The mold closed position for second injection unit is shown at 56 of FIG. 1. Consequently, the connection between the second injection unit 52, the distributor block 20, and the hot runner 22 must be robust enough to transmit these forces of motion while accommodating any variations in alignment between the track of the moving platen 53 and the linear rails 54 that may be caused by thermal expansions or misalignments.

FIG. 8 shows rectangularly-arrayed flexible pads 70, 71 and 72 that are positioned between the subplate 73 and the bottom surface 74 of the second injection unit 52 such that small variations in position and alignment between the second injection unit 52 and the movable platen 53 (containing the hot runner 22) are accommodated, thereby minimizing stress and wear on the second injection unit's carriage assembly 76, the linear rails 54, and the connection to the hot runner. Preferably, each of the flexible pads is made of polyurethane, and is 850 mm long, 65 mm wide, and 25 mm thick. Of course other materials and configurations may be provided, such as any rubber, any flexible plastic material, or any kind of steel spring connection. Of course, one or more flexible pads may be provided in any desired configuration(s) (such as linear, circular, zig-zag, herringbone, triangular, multi-layer, stepped layer, multi-material, etc), and designed to absorb the shock and vibrations caused by the movement of the second injection unit. The flexible pads may be coupled to the second injection unit and/or the subplate. Different one of the flexible pads may be alternately coupled to the injection unit and the subplate. Or, the flexible pads may be uncoupled to either of the injection unit and the subplate.

FIGS. 4-7 show the distributor block 20, that is preferably bolted to the end of the hot runner 22 with a movable, articulated sealed connection 200. Preferably, the movable sealed connection 200 comprises a hot runner extension 21 bolted to the hot runner 22 with bolts 29, a hot runner extension melt channel 202, and has opposed spherical surfaces 23 and 24. These spherical surfaces 23 and 24 are configured so as to mate with concave pads 25 and 26 that are, respectively, disposed between a cap 27 (that is bolted to the distributor block 20 with screws 28) and the distributor block 20. Preferably, each of the concave pads is made of H13 steel, and is 80 mm in diameter, and 40 mm thick. Of course other materials and configurations may be provided, such as ceramic and any steel or copper alloys. The pads may be bolted to their seat or just be held by compression force from the spring package. Preferably, each of the spherical surfaces 23, 24 is made of H13 steel, and comprises a hemispherical shape having a diameter of 120 mm. Of course, other flexible connections such as an interface part of cylindrical shape or melt channel connection with a "thin" wall tubing may be provided to ensure a movable yet sealable connection between the hot runner 22 and the injection unit barrel head 32.

A spring pack 30 is disposed to urge the concave pad 25 to press the hot runner extension 21 against the concave pad 26, thereby maintaining a good seal at the interface of the concave pad melt channel 31, which passes through the concave pad 26. The molten material thus moves from the injection unit barrel head 32, through the distributor block melt channel 33, through the concave pad melt channel 31, through the hot runner extension melt channel 202, and into the hot runner melt channel 204. This structure is described in more detail in copending U.S. patent application Ser. No. 10/_,_ entitled SELF ALIGNING ARTICULATED JOINT FOR USE IN HOT RUNNER SYSTEM.

A three position shut off valve plunger 34 is mounted in the distributor block 20 and is configured to allow the material (i) to pass through the valve, (ii) to be blocked by the valve, or (iii) to be diverted to a purging channel 35, depending upon the plunger's position. See FIG. 5. The three position shut off valve assembly is the subject of copending U.S. patent application Ser. No. 10/_,_ entitled INJECTION MOLDING THREE-WAY SHUT OFF VALVE AND METHOD, and is described therein. In FIG. 3, the housing of a first cylinder 81 of a first piston 80 for controlling the three way shut off valve is shown.

The distributor block 20 is heated conventionally with tubular heaters 36, or the like. The distributor block 20 is bolted to the injection unit barrel head 32 such that variations in the geometric relationship between the injection unit barrel head 32 and the hot runner 22 (caused by thermal expansion or movement during the opening and closing strokes of the machine) are accommodated by the sealing connection between the spherical surfaces 23 and 24 and the concave pads 25 and 26 of the interface.

3. The Operation of the Preferred Embodiment

In operation, as the second injection unit is moved along rails 54, the flexible pads 70-72 will absorb any misalignment caused by this movement.

4. Conclusion

Advantageous features according to the present invention include:

The flexible mount to the injection unit subplate and linear rails has a novel configuration.

The method of dampening vibrations in the moving injection unit is novel.

Thus, what has been described is a method and apparatus for providing a self-aligning articulated injection molding coupling which allows the melt to be transmitted between the injection unit and the hot runner system in a movable mold component. Also described above has been a method and apparatus for providing a relatively flexible mounting assembly for mounting the relatively movable injection unit housing to the stationary rails.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patent documents discussed above are hereby incorporated by reference into the Detailed Description of the Preferred Embodiment.

What is claimed is:

1. An injection molding coupling for use between a relatively movable injection unit and a relatively stationary unit base, comprising:
  a subplate configured to be relatively movable with respect to the unit base; and
  a flexible pad device configured to be disposed between said subplate and the injection unit, and configured to absorb shock and vibration during unit stroking; and
  a self aligning articulated joint configured to be disposed between the injection unit and a hot runner, said articulated joint comprising:

a joint having first and second spherical surfaces and a melt channel therein, said joint being substantially fixedly coupled to one of the injection unit and the hot runner; and first and second concave pads respectively in contact with said first and second spherical surfaces and configured to be movable with respect thereto, at least one of said first and second concave pads being substantially fixedly coupled to the other one of the injection unit and the hot runner, said at least one of said first and second concave pads having a melt channel configured to be in fluid communication with said joint melt channel.

2. An injection molding coupling according to claim 1, wherein said flexible pad device comprises a plurality of linearly-arrayed flexible pads.

3. An injection molding coupling according to claim 1, wherein said flexible pad device comprises a plurality of polyurethane flexible pads.

4. An injection molding coupling according to claim 1, wherein said flexible pad device comprises a plurality of polyurethane flexible pads, each pad being substantially and 850 mm long, 65 mm wide, and 25 mm thick.

5. An injection molding coupling according to claim 1, wherein said subplate comprises a plurality of bearings configured to move with respect to the unit base.

6. Coupling apparatus for coupling a relatively movable injection unit and a relatively stationary support structure in an injection molding machine, said coupling apparatus comprising:
    an interface device including at least one bearing disposed to move along the relatively stationary support structure; and
    a flexible pad device configured to be disposed between the injection unit and the interface device, and configured to absorb misalignment between the relatively movable injection unit and the relatively stationary support structure; and
    a self aligning articulated joint configured to be disposed between the injection unit and a hot runner, said articulated joint comprising:
        a joint having first and second spherical surfaces and a melt channel therein, said joint being substantially fixedly coupled to one of the injection unit and the hot runner; and
        first and second concave pads respectively in contact with said first and second spherical surfaces and configured to be movable with respect thereto, at least one of said first and second concave pads being substantially fixedly coupled to the other one of the injection unit and the hot runner, said at least one of said first and second concave pads having a melt channel configured to be in fluid communication with said joint melt channel.

7. Apparatus according to claim 6, wherein said at least one bearing comprises four linear bearings.

8. Apparatus according to claim 6, wherein said relatively stationary support structure comprises two linearly-arrayed rails.

9. Apparatus according to claim 6, wherein said flexible pad device comprises at least two rectangularly-arrayed flexible pads.

10. Apparatus according to claim 9, wherein each of the flexible pads comprises a polyurethane pad.

11. Apparatus according to claim 6, wherein said flexible pad device comprises three polyurethane flexible pads.

12. Apparatus according to claim 6, wherein said flexible pad device is not fixedly coupled to the injection unit.

13. A method of coupling a relatively movable injection unit to a relatively stationary unit base in an injection molding device, comprising the steps of:
    disposing a subplate so as to be relatively movable with respect to the relatively stationary base unit;
    disposing a plurality of flexible pads between the subplate and the relatively movable injection unit, the plurality of flexible pads being configured to absorb stresses induced by the relative movement of the injection unit and the base unit;
    disposing a self aligning articulated joint between the injection unit and a hot runner, the self aligning articulated joint having a joint with first and second spherical surfaces and a melt channel therein;
    fixedly coupling said joint to one of the injection unit and the hot runner;
    placing said first and second concave pads in contact with said first and second spherical surfaces;
    fixedly coupling at least one of said first and second concave pads to the other one of the injection unit and the hot runner; and
    configuring a melt channel in said at least one of said first and second concave pads to be in fluid communication with said joint melt channel.

* * * * *